April 14, 1964
D. LABINO
3,129,084
MACHINE AND PROCESS FOR FORMING GLASS FIBERS
Original Filed Feb. 16, 1956
4 Sheets-Sheet 1
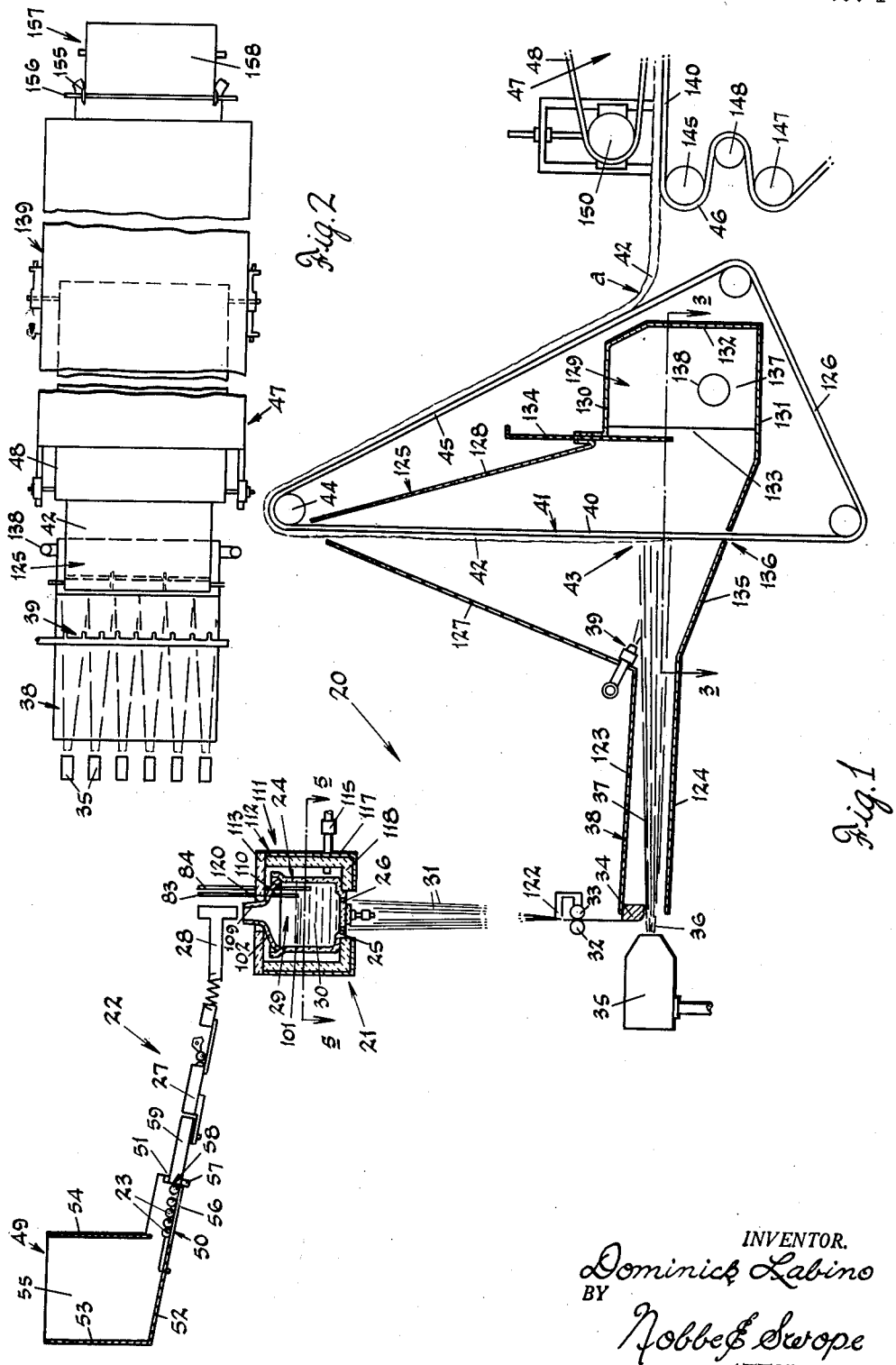
INVENTOR.
Dominick Labino
BY
Nobbe & Swope
ATTORNEYS April 14, 1964
D. LABINO
3,129,084
MACHINE AND PROCESS FOR FORMING GLASS FIBERS
Original Filed Feb. 16, 1956
4 Sheets-Sheet 2
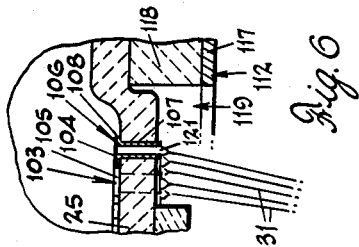
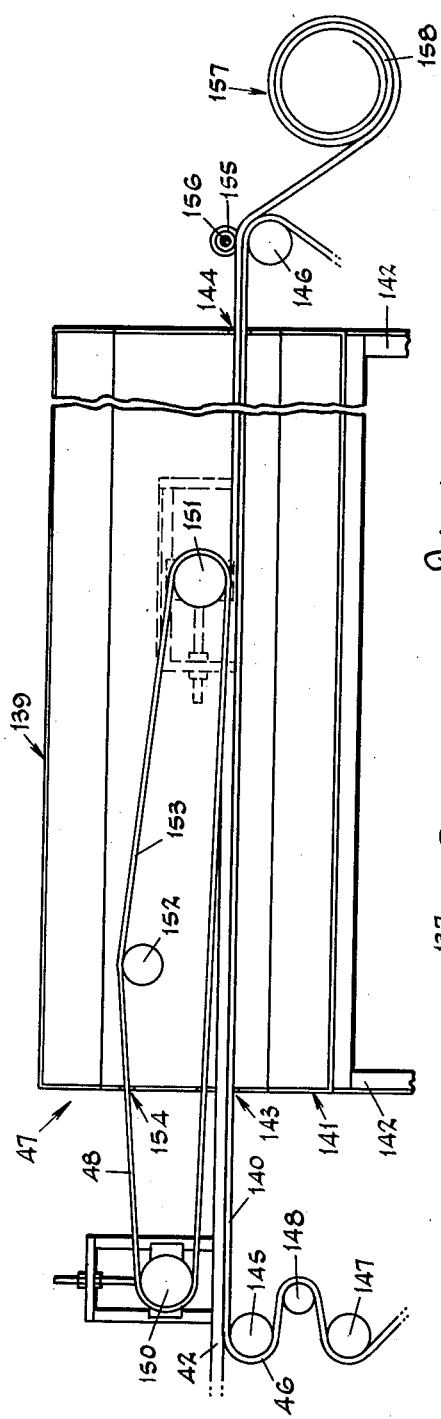
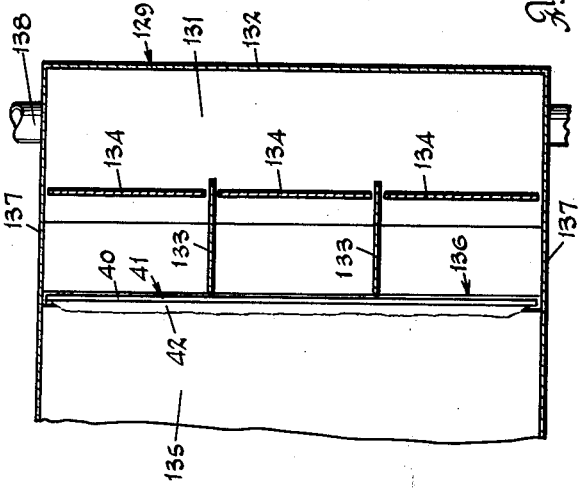
INVENTOR.
Dominick Labino
BY
Nobbe & Swope
ATTORNEYS April 14, 1964

D. LABINO 3,129,084

MACHINE AND PROCESS FOR FORMING GLASS FIBERS

Original Filed Feb. 16, 1956

INVENTOR.
Dominick Labino
BY
Nobbe & Swope
ATTORNEYS

April 14, 1964            D. LABINO            3,129,084
MACHINE AND PROCESS FOR FORMING GLASS FIBERS
Original Filed Feb. 16, 1956            4 Sheets-Sheet 4

INVENTOR.
Dominick Labino
BY
Nobbe & Swope
ATTORNEYS

United States Patent Office
3,129,084
Patented Apr. 14, 1964

3,129,084
MACHINE AND PROCESS FOR FORMING
GLASS FIBERS
Dominick Labino, Grand Rapids, Ohio, assignor to
Johns-Manville Corporation, New York, N.Y., a corporation of New York
Continuation of abandoned application Ser. No. 565,808,
Feb. 16, 1956. This application Mar. 12, 1963, Ser.
No. 264,687
7 Claims. (Cl. 65—2)

The present invention relates to a glass fiber forming machine and to a process for forming glass fibers.

This application is a continuation of my co-pending application Serial No. 565,808, filed February 16, 1956, now abandoned.

In one aspect, this invention relates to an improved machine and process for forming blown glass fibers wherein refractory pots or crucibles are employed to melt the glass and to form the molten glass into primary filaments which are subsequently attenuated into very fine glass fibers.

In another aspect, this invention relates to an improved machine and process for continuously collecting the blown fibers and forming them into mats or batts.

In a further aspect, this invention relates to an improved machine and process for forming blown glass fibers from glass marbles and which embodies a novel type of marble feeder for supplying marbles at a metered rate to the melting pot or crucible.

In order to form filaments and fibers of glass it is customary to establish a supply of molten glass and to exude the same through small orifices of a metal crucible, whereupon the filaments are drawn from globules of the molten glass existing at the orifice exit, the drawing taking place either by mechanical means or by the utilization of gaseous blast or combinations thereof.

It has been usual in the art, in order to secure the required strength, chemical resistance and uniform heating conditions, to retain the supply of molten glass and to effect heating of the same within a crucible which is formed of expensive metals or alloys such as platinum, platinum-rhodium, etc. Such crucibles are not useful with all types of glass, have a relatively short operating life before requiring repair, and are costly to repair, so that they occasion relatively high manufacturing costs.

The production of fine filaments of glass is a process which imposes stringent requirements on the glass itself as well as on the equipment utilized. Thus the viscosity of the glass must be so controlled that the glass flows through all of the spaced orifices of the crucible at a uniform rate to form adherent globules of molten glass on the underside of the base of the crucible, and it is from these globules that the filaments are produced by rapidly attenuating the glass. Viscosity control is attained by temperature control—too high a temperature results in a low viscosity and flooding of the glass from the crucible, while a low temperature and consequent high viscosity result in "freezing" of the glass at the orifices. The degree of temperature within the molten glass is usually in the range of 2000° F.–2500° F. for commercial filament production, the glass composition being prepared to yield a suitable viscosity at a temperature condition in about this range.

Metal crucibles are sufficiently heat conductive and have suitable characteristics to provide a useful substantially uniform temperature condition within a body of molten glass of a volume which is useful in commercial filament production; particularly the heat conductive metallic base attains a reasonably uniform overall temperature condition and the glass exuding through the orifices may accordingly be suitably controlled as to uniformity of temperature and viscosity. The objections of high initial cost, relatively short operating life, inability to handle all glasses, particularly those containing lead, and the cost of repairs, however, are inherent and highly undesirable inadequacies of these crucibles.

It is accordingly an important object of this invention to provide a melting crucible or pot which is readily formed of inexpensive material, which is resistant to substantially all types of glasses, and which is expendable upon the termination of its operating life.

Another important object of the invention is to provide a crucible or pot produced of a fire clay material which is insoluble in molten glass and which has sufficient strength to retain the molten glass, sufficient heat conductivity to permit uniform heating of the glass contained therein, has a high resistance to thermal shock which permits relatively fast heating comparable with that attained by the metal (platinum) crucibles and which may be conveniently provided with orifices or apertures for the necessary exuding of the glass.

A further important object of the invention is to provide heating apparatus in conjunction with the fire clay crucibles or pots of this invention which is effective to permit attainment of substantially uniform temperature conditions within the body of glass in the pot or crucible.

A further important object of the invention is to provide, in combination, means for attenuating the glass filaments drawn from the pot or crucible into fine glass fibers, and novel means for collecting the fine fibers to form a mat or batt.

A still further important object of the invention is to provide a novel and improved means for feeding raw glass in the form of marbles at periodic intervals to the melting pot or crucible, said means operating to grade the marbles and reject those not the required size or which have been broken.

Other objects and advantages of the invention will become more apparent during the course of the following description when taken in connection with the accompanying drawings.

In the drawings wherein like numerals are employed to designate like parts throughout the same:

FIG. 1 is a diagrammatic view partially in section, of a machine constructed in accordance with the invention for the continuous production of mats or batts from blown glass fibers;

FIG. 2 is a plan view of the machine shown in FIG. 1;

FIG. 3 is a detail horizontal section view taken along the line 3—3 of FIG. 1;

FIG. 4 is a side view of the oven section and product roll-up station employed in the machine of FIGS. 1 and 2;

FIG. 5 is a horizontal sectional view of the melting pot or crucible taken along the line 5—5 of FIG. 1;

FIG. 6 is an enlarged sectional view through a portion of the bottom of the melting pot showing a platinum tip insert;

Figure 7:
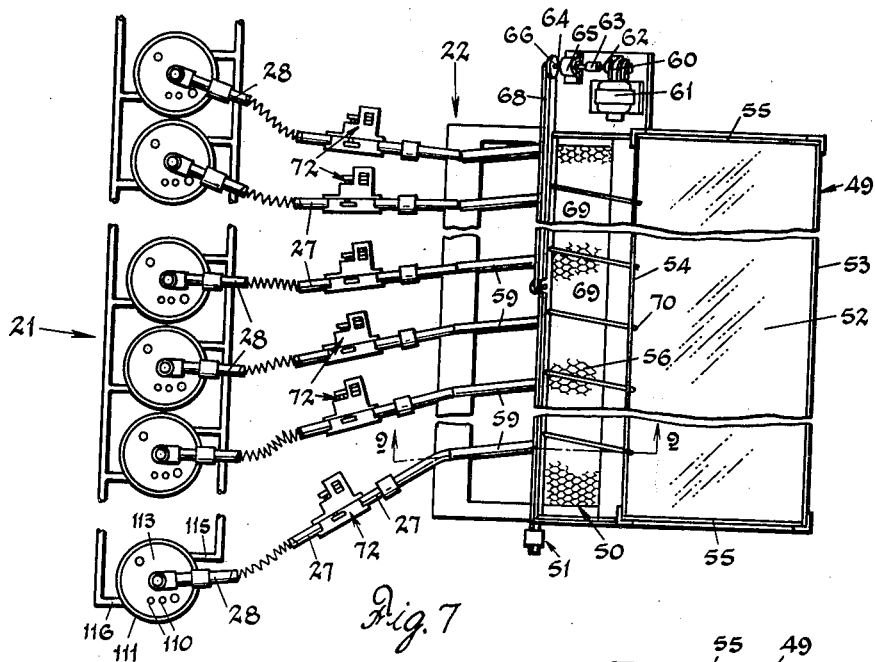
FIG. 7 is a plan view of the marble feeder unit.
Figure 8:
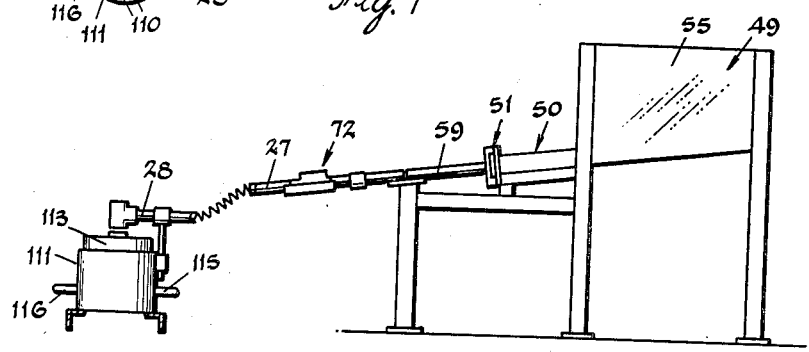
FIG. 8 is a side view of FIG. 7.

With reference now to the drawings and particularly to FIG. 1, the machine of the present invention is generally designated by the numeral 20 and includes a primary filament forming section 21 comprised of a marble feeder 22 for feeding glass marbles 23 at a metered rate into a melting pot 24. The pot 24 is gas fired to provide a melting temperature for the glass marbles 23 and is provided in the bottom 25 thereof with a plurality of small orifices 26 arranged in the form of circular concentric rows. Glass marbles 23 supplied by the marble feeder 22 roll through appropriate conduits 27 and 28 into the interior 29 of the melting pot 24 wherein they are melted to form a body of molten glass 30. The molten glass 30 flows or is exuded through the orifices 26 and is formed into primary filaments 31 which are drawn vertically downwardly by a pair of rubber covered feed rolls 32 and 33. As the filaments are drawn downwardly they become solidified and upon leaving the rolls 32 and 33 are continued downwardly to a guide 34. Positioned below and aljacent the guide 34 is a burner 35 adapted to produce an extremely hot gaseous blast 36 of high velocity. The primary filaments 31 are fed down the side of the guide block 34 and are exposed to the blast 36 from the burner 35 whereby they are melted and attenuated into extremely fine fibers 37.

A forming chute 38 disposed in front of the burner 35 receives and directs the attenuated fibers 37 past a binder spray zone 39 and onto the vertically disposed flight 40 of a continuous collecting chain conveyor 41. The flight 40 of the collecting chain 41 moves continuously upwardly and as it does, a mat 42 of fibers is built up thereon and is carried by the chain 41 from the collecting zone 43 upwardly and around a top chain support roll 44, and thence down the effluent flight 45 to the point *a* where it is removed onto the support chain 46 which conveys the mat through an oven 47.

The fibrous mat 42 is, at this stage, in a fluffy condition and is also sticky because of the uncured binder which was applied thereto in the spray zone 39. The mat 42 is moved through the oven 47 wherein the binder is cured and pressure applied to the top of the mat by means of a chain 48 to compress the mat to a specified thickness and density. At the exit end of the oven 47, as one embodiment of the invention, the continuous mat 42 can be rolled for shipment to users or for transfer to other machines for cutting, laminating or other operations.

Figure 12:
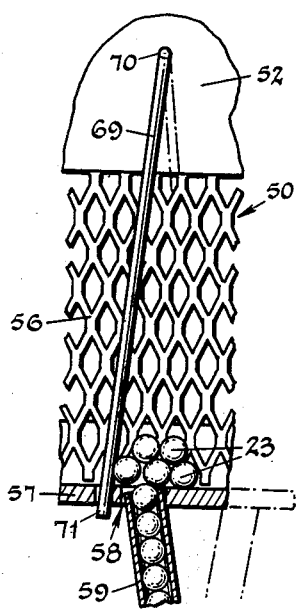
FIG. 12 is a plan view of the marble chute and agitator section shown in FIG. 9.

The marble feeder 22 shown in FIGS. 1 and 7 through 14 comprises a hopper 49 of rectangular configuration having marble chute 50 along its front lower edge which leads to a reciprocating tube carrying header 51. The bottom 52 of the hopper 49, like the upstanding sides 53, 54 and 55, is preferably fabricated of sheet metal. However, the marble chute 50 emanating from the front as shown in FIG. 12, has a bottom surface 56 formed of expanded metal. This provides a screen through which undersized or broken marbles and glass chips can fall by gravity into a suitable container, not shown, so that only whole marbles 23 are fed to the melting pot 24. The top of the marble chute 50, like the hopper 49, is open for visual observation of marbles 23 and for replenishing the supply when required.

Figure 9:
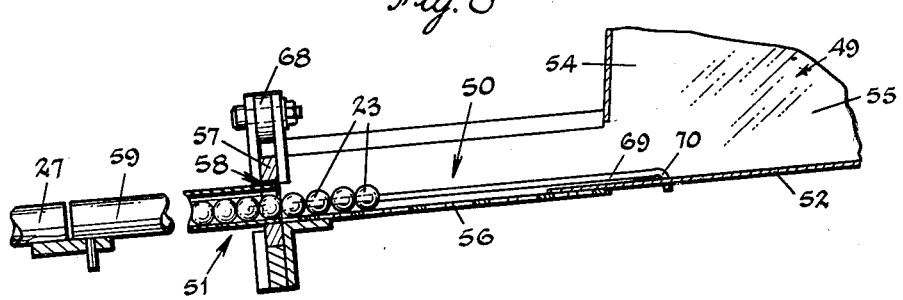
FIG. 9 is an enlarged sectional view taken substantially on the line 9—9 of FIG. 7.
Figures 10, 11:
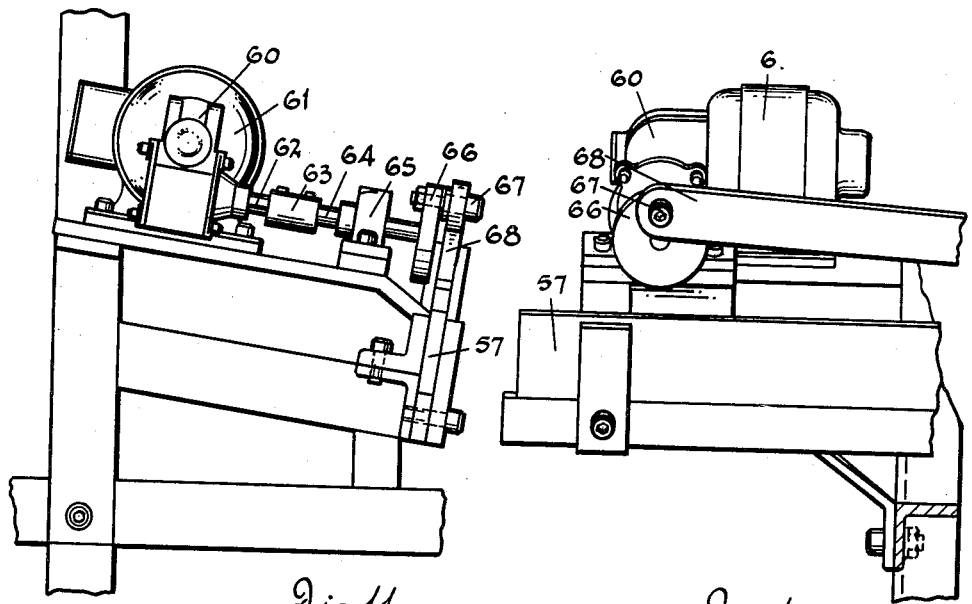
FIG. 10 is a front view of the motor drive of the marble feeder shown in FIGS. 7 and 8.
FIG. 11 is an end view of the motor drive of FIG. 10.

The marble tube header 51 comprises a slidable steel bar 57 shown in section in FIGS. 1 and 9 which is provided with apertures 58 into which the ends 59 of the marble tubes 27 are inserted. The header bar 57 is adapted to be slowly moved back and forth by means of a gear reducer 60 shown in FIGS. 7, 10 and 11. The gear reducer 60 is driven by an electric motor 61. The shaft 62 of the gear reducer 60 is connected by a sleeve 63 to a drive shaft 64, journaled in an anti-friction bearing unit 65, FIG. 11. The drive shaft 64 is provided at its outer end with a circular plate 66 on which a connecting arm bolt and bearing assembly 67 is eccentrically mounted. A connecting arm 68 is journaled at its one end on the bolt and bearing assembly 67 and is pivotally connected at its other end, FIG. 7, to medial position on the tube header bar 57. As the motor 61 of the gear reducer 60 turns, the drive shaft 64 is slowly rotated and through the eccentric bearing 67 and connecting arm 68, a slow reciprocating movement is imparted to the header bar 57. Thus the tube ends 59 are moved slowly back and forth whereby the marbles 23 are directed into the tubes 27.

As shown in FIG. 12, agitator elements 69, having their one ends 70 pivoted in the bottom 52 of the hopper 49 and their other ends 71 pivotally connected to the header bar 57, provide agitation to feed the marbles 23 from the hopper 49 across the expanded metal bottom 56 of the chute 50 for deposit in the tube ends 59. The amount of movement of the tube ends 59, header bar 57 and agitator elements 69 is shown by the solid and phantom lines of FIG. 12.

Marble movement in the present invention is very slow and very gentle so that marble breakage is substantially completely eliminated. Also the present feeder automatically screens out glass chips and pieces of glass marbles resulting from previous bulk handling, assuring that whole marbles 23 are fed to the melting pot 24 for more careful control of the glass level therein. Also marble tube stoppage is substantially completely eliminated.

Figure 13:
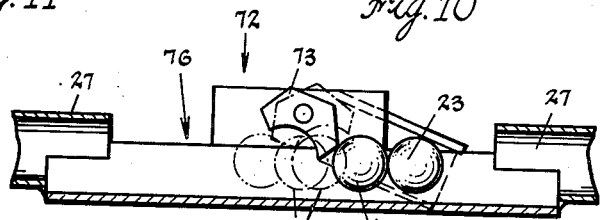
FIG. 13 is a detail view of the marble metering device.
Figure 14:
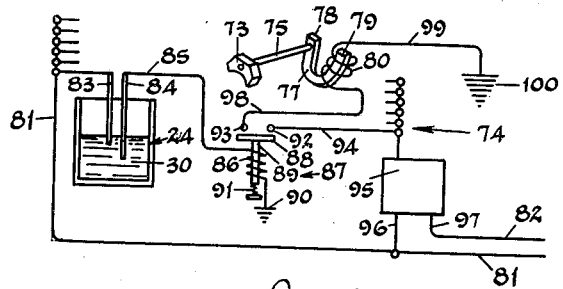
FIG. 14 is a schematic view of the electrical control circuit for activating the marble metering device of FIG. 13.

As shown in FIGS. 13 and 14, the marble metering device 72 includes a gate 73 adapted to permit passage of a single marble 23 in response to call and activation by a liquid glass level control circuit 74. The gate 73 is mounted on one end of a rotatable shaft 75 and is positioned to operate through an opening 76 in the top of the glass marble feed tube 27. The other end of the gate mounting shaft 75 is provided with a U-shaped bar 77, having the tip of one arm of the U rigidly secured to the shaft 75 whereby the U-bar 77 is mounted in a plane perpendicular to they axis of the shaft 75. Suitable antifriction bearings are provided for journaling the shaft 75. The other arm 79 of the U-bar 77 is encircled by a solenoid coil 80 and upon activation of the coil, the arm 79 is pulled into the coil. This movement causes the gate 73 to move from the position shown in solid outline to the position shown in dotted outline in FIG. 13. After a short interval, contact is broken to deactivate coil 80 and the weight of arm 79 of the U-bar 77 causes it to fall downwardly by gravity, carrying the gate 73 back to the position shown in solid outline. The cycle thus permits passage of one marble through the tube 27. For example, the marble shown in position *b* is the one which occupies the lead position of the column of marbles retained by the tube 27 and tube end 59. When the gate 73 is moved to the dotted outline position, the marble is permitted to move from position *b* to position *c*. Then when the gate 73 returns to its starting position, the marble is released from position *c* and is permitted to move on down the tube 27.

The control circuit 74 whereby the gate 73 is actuated is shown in FIG. 14 and comprises a pair of current carrying lines 81 and 82. Line 81 leads to a first probe 83 positioned within the melting pot 24 and adapted for vertical adjustment, depending upon the head of glass desired to be maintained within the pot. A second probe 84 extends well below the tip of probe 83, where the glass level is expected to be maintained, thereby assuring that its lower end will always be submerged in the molten glass 30. The number two probe 84 is connected by a line 85 to a solenoid coil 86 of a switch assembly 87. The switch assembly 87 includes a movable contact arm 88, secured to the end of a solenoid rod 89. The solenoid rod 89 is movable within the solenoid coil 86 to which line 85 connects, the other side of the coil going to ground 90. A spring 91 normally urges contact arm 88 to a contact position, but coil 86 when actuated opposes the action of the spring. A pair of contact points 92 and 93 are positioned so as to be bridged by the contact arm 88. The first point 92 connects to line 94 leading from an impulse box 95, connected by lines 96 and 97 to current supply lines 81 and 82. The second contact point 93 connects to line 98 leading to the solenoid coil 80 surrounding U-arm 79 and thence by line 99 to ground 100. Impulse box 95 contains a suitable mechanism for sending out periodic electrical impulses through line 94, adapted to supply current to contact point 92. Impulse box 95 is preferably adapted to send an impulse of about one second duration into line 94 and contact point 92 as spaced intervals of about thirty seconds.

The function of the control circuit 74 is as follows: When the glass level in the melting pot 24 is up so that current flows through the molten glass 30 from probe 83 to probe 84 the switch assembly coil 86 is actuated, holding the control arm 88 away from contact points 92 and 93, against the bias of spring 91. Thus the spaced impulses from impulse box 95 are stopped at contact point number 92. When, however, the glass level falls below the tip of probe 83, the circuit through the molten glass 30 to probe 84, line 85 to switch assembly coil 86 is broken and the spring 91 urges the contact arm 88 into bridging relation with contact points 92 and 93. Thus the next impulse from the impulse box 95 crosses between points 92 and 93 and through the line 98 to the solenoid coil 80 surrounding the U-arm 79. This action swings the U-bar 77 and with it the gate 73, from the position shown in solid outline to the position shown in dotted outline, FIG. 13. This allows the marble at position $b$ to move to position $c$. When the impulse stops, the gate 73 is swung back and the marble rolls from position $c$ through the tube 27 into the melting pot via tubes 27 and 28.

The melting pot 24 of the present invention is shown in FIGS. 1, 5 and 6, and is fabricated of a refractory material, such as a special fire clay composition, sillimanite or the like. Such materials are adapted to withstand the thermal exposure required to render glass batch materials molten for the purpose of producing fibers and are readily fabricated at low cost.

In the present invention the clay melting pot is of cylindrical configuration and is preferably encased within an insulating chamber having a cylindrical cavity of somewhat larger dimension than the outside of the melting pot. Thus, a combustion chamber is formed between the outside of the pot and the inner wall of the insulating casing. Suitable gas burners are inserted at selected spacings through apertures in the walls of the insulating container and are disposed at a tangent with respect to the cylindrical pot wall. Thus a uniform and intense zone of combustion is provided to blanket the exterior cylindrical walls of the melting pot with a flame envelope whereby heat is rapidly transmitted through the walls of the melting pot to the glass materials contained therein. By virtue of this construction of pot and insulating casing, the body of molten glass retained within the melting pot is sustained at a uniform temperature throughout all parts thereof; and being in direct heat exchange relation with the walls of the melting pot is quickly and readily provided with sufficient influent heat to render additional glass materials added thereto substantially immediately molten, thus causing them to blend with the previously existing molten glass to provide and maintain a homogeneous and evenly heated body of molten glass for fiber production.

The refractory clay pots are not only inexpensive and easily replaceable, as well as being resistant to substantially all types of glasses, but also lend themselves admirably to the melting of glasses at substantially lower melting temperatures. One glass composition which is particularly advantageous for use in the clay pots of this invention comprises the following ingredients in substantially the amounts indicated in weight percent.

| | |
|---|---|
| $B_2O_3$ | 9–15 |
| $R_2O_3$ ($Al_2O_3$, $TiO_2$, $Fe_2O_3$) | 5–10.5 |
| $Na_2O$ | 8–13 |
| $K_2O$ | 2–5 |
| $CaO$ | 1–4 |
| $MgO$ | 0.05–1.0 |
| $BaO$ | 2–6 |
| $ZnO$ | 2–6 |
| $CaF_2$ | 1.0–3 |

Glass compositions falling within the above defined ranges are characterized by extremely low melting points as compared to present commercial glasses. Glasses prepared from these compositions are characterized by low fiber melting points falling in the range from 1250 to 1280° F. The advantage of such glass compositions is that a very low heat energy input is adapted to provide a high throughput in the most economical manner. Additionally, by using the foregoing glass compositions, fibers of surprising durability against chemical attack are also provided. For example, one such glass composition had a high resistance to acid loss as indicated by a 2.34 weight percent loss after exposure of fibers made from the composition to 1.0 N $H_2SO_0$.

More particularly, the pot assembly 24 includes a body 101 and a lid 102 both made of high temperature resistant refractory material. The body 101 is of cylindrical cross section and is closed at the bottom 25, except for the orifices 26, comprising a tip section 103, FIG. 5, through which the glass exudes. The tip section 103 comprises two or more circular concentric rows 104 and 105 of spaced holes 26 having their axes parallel to the axis of the pot 24. As shown in FIG. 6, tubular platinum alloy inserts 106 are preferably inserted into the holes 26 to prevent erosion by the molten glass passing therethrough. A platinum alloy insert 106 includes a tubular body 107 and an integrally formed end flange 108. The purpose of the flange 108 is two-fold: (1) it positions the insert 106 when it is pressed into the orifice 26; and (2) it raises the glass feed position a short distance above the bottom 25 of the pot 24 so that sediment can settle to the bottom of the pot and not be drawn through the orifice.

The top 102 of the pot 24 is of inverted funnel-like configuration and is of circular section at its lower end and thereby adapted to rest upon the top edge of the walls of the pot body 101. A metal tube 28 is positioned immediately above the circular opening 109 at the apex of the pot lid 102 and forms part of the marble feeding conduit assembly. The tube 28 is open so that an operator can look down through it into the interior 29 of the pot 24 to check on the condition of the pot. Apertures 110 are provided in the pot lid 102 through which the probes 83 and 84 of the marble feed control circuit 74 are inserted. The function and purpose of the probes 83 and 84 are described above.

A housing 111 encloses the melting pot 24, and consists of two parts: a body 112 and a lid 113. As shown in FIG. 5, the housing 111 is of cylindrical configuration and is larger than the diameter of the melting pot 24 to provide a combustion chamber 114 for a gas-air mixture introduced by burners 115 and 116. The housing body 112 is comprised of an outer sheet metal case 117 with a refractory clay liner 118 around the inside. A circular aperture 119, FIG. 6, is provided in the bottom of the housing body 112 to accommodate the tip section 103 of the melting pot 24 to allow passage of the primary filaments 31 from the pot. The housing top 113, FIG. 1, is made of a refractory material and is in the form of a round plate adapted to fit upon the top of the body 112. The top 113 is also provided with a circular opening 120 to accommodate the step 110 of the top 102 of the pot 24. Thus the pot 24 is enclosed in a heated chamber 114 in which a combustible gas is burned. The burning mixture heats the walls of the pot 24 which radiate to the body of glass 30 contained therein for maintaining the glass in a molten condition, and also for melting marbles 23 fed thereinto.

The molten glass 30 exudes from the tips 106 as shown in FIG. 6, in the form of globules 121 from which primary filaments 31 are drawn downwardly by means of the feed rolls 32 and 33. The feed rolls 32 and 33 have their axes positioned parallel to each other in a horizontal plane so that their peripheries are in contacting relationship. The peripheries of the rolls 32 and 33 are suitably covered with rubber or other friction material to provide a friction surface for positive and uniform feeding and drawing of the primary filaments 31. A grooved guide block 122 is positioned above the drawing rolls 32 and 33 for aligning the primary filaments 31 prior to their passage between the rolls. After passing between the rolls 32 and 33 the filaments 31 continue downwardly and pass through grooves provided on the front face of the burner guide block 34. The burner 35 is adapted to produce a high velocity and high temperature gaseous blast 36 as a long, narrow band. The burner 35 is positioned so that its effluent gases 36 pass immediately beneath the guide block 34. As the primary filaments 31 move downwardly past the guide block 34 and are exposed to the high intensity blast 36, their lower ends are melted and they are attenuated by the force of the blast to very fine filaments 37.

The blast 36 of the burner 35 is directed into a fiber forming chute 38 through which the fibers 37 are blown to the collecting conveyor 41. The fiber forming chute includes a top panel 123 and a bottom panel 124 positioned approximately in a horizontal plane and slightly converged toward each other from the burner 35 toward the fiber collection zone 43. The top 123 and bottom 124 of the fiber forming chute 38 comprise part of the air exhaust chamber 125. The fiber collecting chain 41 is adapted to enter and leave the exhaust chamber 125 through appropriate openings therein and includes a vertically disposed fiber collecting flight 40, a rearwardly and downwardly tilted effluent flight 45 and a forwardly and downwardly tilted return flight 126. The exhaust chamber 125 has a front wall 127 joined at its bottom edge to the rear edge of the top panel 123 of the forming chute 38 and extends upwardly to a point near the top of the collecting flight 40 of chain 41, with appropriate clearance to permit passage of the chain. From behind this point of the collecting flight 40, a wall 128 slopes downwardly and joins with the front upper edge of a baffle box 129. The baffle box 129 is comprised of a top wall 130 and a bottom wall 131 and a vertical rear wall 132, all of sheet metal and welded into an integral unit extending horizontally the width of chain 41. As shown in FIG. 3 vertically disposed partitions 133 divide the exhaust chamber in front of the baffle box 129 into three compartments of approximately equal volume. The rear of each compartment, leading into the baffle box 129 is comprised of a vertically movable damper plate 134 adapted to be positioned in such manner as to regulate the size of opening leading into the baffle box.

A bottom wall 135 joins with the lower edge of the baffle box 129 and extends upwardly and forwardly and joins to the rear edge of the bottom 124 of the forming chute 38. A slot 136 is provided in the bottom wall 135 to permit passage of the collecting flight 40 of the forming chain 41.

As shown in FIG. 3 the exhaust chamber and baffle box are provided with ends 137. An outlet 138 is provided in one of the end walls 137 of the baffle box 129 and connects with suitable exhaust fan.

Thus air is drawn by the exhaust fan into and through the forming chute 38 and through the openings of the collecting flight 40 of the conveyor chain 41. The air then passes into the baffle box 129 and out through the opening 138. Fibers 37 produced by the burner 35 are drawn through the forming chute 38 and are deposited on the collecting flight 40 of the conveyor chain 41 where they are built up into a mat 42 on the front surface of the collecting flight.

The fibers 37 collect into a mat 42 of varying thickness depending upon fiber output of the burner 35 and speed of the chain 41. The mat 42 moves upwardly with the chain 41 and out through the top opening of the exhaust chamber 125, around the upper chain support pulley 44, and downwardly on the effluent flight 45 of the chain. The mat 42 is removed from the lower portion of the effluent flight 45 as at $a$ and is directed onto the conveyor chain 46 of the oven 47.

The oven 47 is shown in its entirety in FIGS. 2 and 4, and includes a heated chamber 139 within which the forward flight 140 of the conveyor chain 46 is adapted to be horizontally moved. The over chamber 139 is constructed as an elongated housing of rectangular section supported by a steel framework 141 having support legs 142. The walls of the chamber are covered with an insulating material and the chamber is provided with a suitable heating means such as gas burners. An entrance opening 143 for the forward flight 140 of conveyor chain 46 is provided in the front end of the oven and an exit opening 144 is provided at the rear end. The entrance and exit openings 143 and 144 are adjustable to accommodate varying thicknesses of mats 42.

The forward flight 140 of the conveyor chain 46 is supported at its front and rear ends by rolls 145 and 146. The reverse flight is supported by a first idler roll, not shown, and a second idler roll 147 positioned beneath roll 145. A take-up roll 148 is adjustably positioned between rolls 147 and 145 for adjusting the tension of the chain 46 as desired.

A packer chain 48 is also adapted to operate within the oven and is disposed above the forward flight 140 of the conveyor chain 46. The forward flight of the packer chain 48 is supported at its forward end by a vertically adjustable roll 150 and at its rearward end by a horizontally and vertically adjustable roll 151. An idler roll 152 supports the return flight 153 of the packer chain 48. The front and rear ends of the packer chain 48 are vertically adjustable to accommodate varying thicknesses of mat 42, and the rear end is horizontally adjustable to provide proper chain tension. An opening 154 is provided in the front end of the oven housing 137 to accommodate the return flight 153 of the packer chain 48.

Thus as the mat 42 moves through the oven 47 it is supported upon forward flight 140 of the conveyor chain 46 and is adapted to be compressed to uniform thickness by the adjustable packer chain 48 and during such compression is cured to a mat 42 of desired thickness and density by the heat within the oven.

A rotary knife 155 is positioned upon a horizontal shaft 156 over the mat 42 for slitting them to desired width. One or more of such slitter knives 155 may be used as desired. Of course, where the full width of mat is to be employed, no knives will be used.

The mat roll-up section is shown at 157 for forming rolls 158 of material either for shipment to users or for transfer to other machines for cutting to appropriate shape, laminating or the like as desired.

It is to be understood that the form of the invention herewith shown and described is to be taken as a preferred embodiment of the same, but that various changes in the shape, size and arrangement of parts may be resorted to without departing from the spirit of the invention or the scope of the subjoined claims.

I claim:

1. The method of continuously melting glass increments and continuously forming glass filaments, comprising:

(a) providing a glass melting zone defined by a refractory clay crucible;

(b) providing in said melting zone a supply of glass;

(c) heating the exterior of said crucible with hot gaseous products of combustion while isolating said products of combustion from the interior of said crucible;

(d) melting said glass in said zone with heat transferred from said crucible to provide a body of molten glass from which a plurality of exudations are exuded generally vertically downwardly through the bottom of said crucible;

(e) and drawing from said exudations a plurality of glass filaments.

2. The method as described in claim 1, wherein the supply of glass has a composition of:

| Constituent— | Percent by weight |
|---|---|
| $SiO_2$ | 47–60 |
| $B_2O_3$ | 9–15 |
| $R_2O_3(Al_2O_3, TiO_2, Fe_2O_3)$ | 5–10.5 |
| $Na_2O$ | 8–13 |
| $K_2O$ | 2–5 |
| CaO | 1–4 |
| MgO | 0.05–1 |
| BaO | 2–6 |
| ZnO | 2–6 |
| $CaF_2$ | 1.0–3 |

3. In apparatus for continuously melting glass increments and continuously forming glass filaments, the combination comprising:

(a) a refractory clay crucible having a bottom and a peripheral side wall for containing a supply of molten glass, (b) said bottom wall being provided with a plurality of generally vertically downwardly extending and normally open orifices through which glass is continuously exuded to form a plurality of exudations;

(c) an enclosure in spaced relation with said crucible and (d) defining a heating chamber therebetween, to which chamber heating gases are continuously supplied, (e) said crucible and said enclosure being arranged to isolate the heating gases from direct contact with the molten glass and to deter contamination of the molten glass;

(f) means for supplying heating gases to said chamber; and (g) means for drawing filaments from said exudations.

4. Apparatus as claimed in claim 3 wherein:

(a) said means for supplying heating gases is positioned to introduce the gases into the bottom portion of said heating chamber and (b) comprising means for exhausting said gases through an upper portion of said chamber.

5. In apparatus for continuously melting glass increments and continuously forming filaments the combination comprising:

(a) a fire clay receptacle having a bottom and a peripheral wall for containing a supply of glass, (b) said bottom being provided with a plurality of generally vertically downwardly extending orifices through which glass is exuded vertically downwardly to form a plurality of exudations;

(c) an outer casing in spaced relation with said wall and defining a heating chamber therebetween;

(d) said casing including side, bottom and top walls, (e) each of said bottom and top walls being provided with an opening therethrough;

(f) means for continuously supplying hot products of combustion to said chamber, (g) said receptacle being supported within said heating chamber over the casing bottom wall opening and closing said casing bottom wall opening, (h) said orifices being in an area in vertical alignment with said casing bottom wall opening but out of direct communication with said products of combustion, (i) said receptacle also being provided with an inlet port aligned with the casing top wall opening thereby permitting continuous feeding of glass to said receptacle, and (j) said inlet port being elevated in respect to the bottom surface of said top wall thereby deterring entry of said products of combustion and other contaminants to the interior of said receptacle; and (k) means for drawing filaments from said exudations.

6. In apparatus for continuously melting glass increments and continuously forming glass filaments the combination comprising:

(a) a refractory clay glass melting receptacle adapted to withstand sustained glass melting temperatures, (b) said receptacle having side walls, a removable lid, and a bottom, (c) said lid including a flared portion and an inlet throat portion, (d) said bottom being provided with a plurality of generally vertically downwardly extending orifices through which glass is exuded;

(e) an outer casing in spaced relation with said walls and defining a heating chamber therebetween, (f) said casing including side, bottom and top walls, (g) each of said bottom and top walls of said casing being provided with an opening therethrough; and (h) means for continuously supplying heating gases to said chamber, (i) said receptacle being supported within said heating chamber over the bottom wall opening of said heating chamber and closing said bottom wall opening of said heating chamber, (j) said orifices being in an area in vertical alignment with said bottom wall opening but out of direct communication with said products of combustion, (k) said inlet throat portion being aligned with the top wall opening of said casing thereby permitting continuous feeding of glass to said receptacle, (l) said inlet throat portion defining an inlet port elevated in respect to the bottom surface of said top wall of said casing thereby deterring entry of said heating gases to the interior of said receptacle; and (m) means for continuously drawing filaments from said exudations.

7. In apparatus for melting glass marbles and continuously forming glass filaments, the combination comprising:

(a) a refractory clay crucible having a bottom and a peripheral side wall for containing a supply of molten glass, (b) said bottom wall being provided with a plurality of generally vertically downwardly extending normally open orifices through which glass is continuously exuded to form a plurality of exudations;

(c) an enclosure in spaced relation with said crucible and (d) defining a heating chamber therebetween, to which chamber heating gases are continuously supplied, (e) said crucible and said enclosure being arranged to isolate the heating gases from direct contact with the molten glass and to deter contamination of the molten glass;

(f) means for supplying heating gases to said chamber, (g) means for drawing continuous filaments from said exudations;

(h) feeding means continuously feeding glass marbles to said crucible to provide and maintain said supply of molten glass, and (i) said crucible having an inlet in open communication with said feeding means.

No references cited.